United States Patent [19]

Buckminster

[11] Patent Number: 4,770,771

[45] Date of Patent: Sep. 13, 1988

[54] INK SYSTEM WITH SELF-WASHING FILTER

[75] Inventor: William F. Buckminster, Voorhees, N.J.

[73] Assignee: Molins Machine Company, Cherry Hill, N.J.

[21] Appl. No.: 584,050

[22] Filed: Feb. 27, 1984

[51] Int. Cl.⁴ ............................................. B01D 29/38
[52] U.S. Cl. ................................... 210/108; 210/167; 210/412; 210/416.1
[58] Field of Search ............... 210/108, 167, 411, 412, 210/416, 778, 805; 346/140 R

[56] References Cited

U.S. PATENT DOCUMENTS

| | | | |
|---|---|---|---|
| 413677 | 8/1934 | GBX . | |
| 1107585 | 3/1968 | GBX . | |
| 1299486 | 6/1970 | GBX . | |
| 1397832 | 5/1972 | GBX . | |
| 2,338,417 | 1/1944 | Forrest et al. | 210/167 |
| 2,338,418 | 1/1944 | Forrest et al. | 210/167 |
| 3,016,147 | 1/1962 | Cobb et al. | 210/411 |
| 3,275,148 | 9/1966 | Vicino | 210/411 |
| 3,850,802 | 11/1974 | Berger | 210/106 |
| 3,853,762 | 12/1974 | Moatti | 210/108 |
| 3,896,730 | 7/1975 | Garrett et al. | 101/425 |
| 3,944,488 | 3/1976 | Moatti | 210/108 |
| 3,974,768 | 8/1976 | Grobman | 101/425 |
| 3,994,810 | 11/1976 | Schaeffer | 210/108 |
| 4,042,504 | 8/1977 | Drori | 210/107 |
| 4,175,489 | 11/1979 | Gattus | 101/366 |
| 4,284,500 | 8/1981 | Keck | 210/411 |
| 4,295,963 | 10/1981 | Drori | 210/108 |
| 4,297,209 | 10/1981 | DeVisser et al. | 210/411 |
| 4,383,341 | 5/1983 | Altman | 134/168 R |

FOREIGN PATENT DOCUMENTS

| | | |
|---|---|---|
| 413677 | 8/1934 | United Kingdom . |
| 1107585 | 3/1968 | United Kingdom . |
| 1299486 | 6/1970 | United Kingdom . |
| 1397832 | 5/1972 | United Kingdom . |

Primary Examiner—Benoit Castel
Attorney, Agent, or Firm—Seidel, Gonda, Goldhammer & Abbott

[57] ABSTRACT

An ink filter system including a self-washing filter provided with upper and lower cylinder chambers and a piston reciprocable between upper and lower positions in the upper cylinder chamber. First and second inlets are provided for introducing fluid into the upper cylinder chamber on opposite sides of the piston. The filter screen is mounted in the lower cylinder chamber. The filter is cleaned on the upstroke of a spray nozzle which is connected to the piston. The spray nozzle is cleaned on the downstroke of the piston.

6 Claims, 2 Drawing Sheets

INK SYSTEM WITH SELF-WASHING FILTER

BACKGROUND OF THE INVENTION

The present invention is directed to a distribution and filter system for use with liquids such as ink. Such systems and filters are typically employed in flexographic printing.

Ink filters are well known in the printing art. Typically, whenever an ink color change is made, the filter must be disassembled and washed manually by the printing press operator. This is a time-consuming and often distasteful chore for the operator. The operator's clothing and hands may be soiled during the process. This is likely to cause the washing operation to be shortened or improperly performed, with resultant deterioration of the printed product. Since a properly performed washing operation is time-consuming, it results in inefficiency of the printing operation. Moreover, because the filter must be disassembled, the delicate filter screen is subject to damage. During re-assembly, the filter screen may not be replaced. A damaged or missing filter screen could allow foreign matter to pass into the press fountain, resulting in damage to the ink distribution rolls or degradation of the print quality.

Accordingly, there is a need for an ink distribution and filter system wherein the filter can be cleaned or washed automatically without being disassembled.

SUMMARY OF THE INVENTION

Ink distribution and filter system including a self-washing filter comprising upper and lower cylinder chambers and a piston reciprocable between upper and lower positions in the upper cylinder chamber. First and second inlets are provided for introducing fluid into the upper cylinder chamber on opposite sides of the piston. A filter screen is mounted in the lower cylinder chamber. A spray nozzle is connected to the piston so as to reciprocate along a path radially inward of the filter screen during reciprocating motion of the piston. Means are provided for conducting fluid such as wash medium from the upper cylinder chamber to the spray nozzle as it is reciprocated.

An object of the invention is to provide an ink distribution system including a filter which can be cleaned without being disassembled.

A further object of the invention is to provide a self-washing filter which is compact and may be operated automatically.

A further object of the invention is to provide a self-washing filter of simple construction having inexpensive components.

Other objects and advantages of the invention will be apparent from the drawings and from the following description.

DETAILED DESCRIPTION OF THE INVENTION

Figure 1:
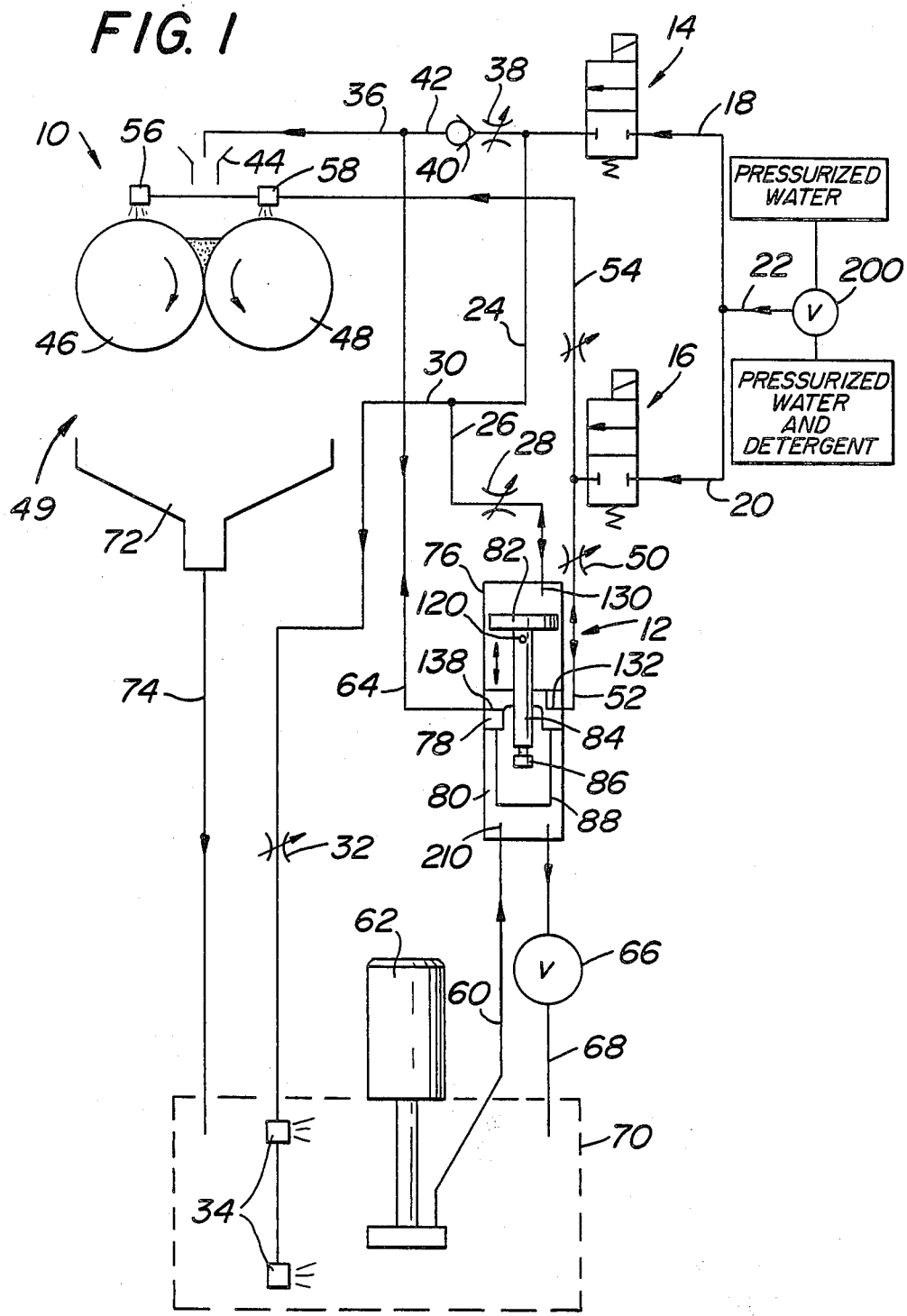
FIG. 1 is a schematic of an ink distribution system utilizing the self-washing filter of the present invention.

Referring to the drawings wherein like numerals indicate like elements, there is shown in FIG. 1 an ink distribution system 10 including a diagrammatic representation of a self-washing filter 12 in accordance with the present invention. Ink distribution system 10 includes a pair of solenoid valves 14, 16 coupled at their inlets by conduits 18, 20 to a conduit 22 fed from a pressurized fluid source. The fluid may be a wash medium such as water or a heated mixture of water and detergent. The outlet of solenoid valve 14 is coupled by conduits 24, 26 and needle valve 28 to an inlet 130 of self-washing filter 12. The outlet of solenoid valve 14 is also coupled by conduits 24, 30 and needle valve 32 to a plurality of spray nozzles 34 positioned within a compartment 70. The outlet of solenoid valve 14 is also coupled to a conduit 36 by a needle valve 38, check valve 40 and conduit 42. The outlet of conduit 36 is positioned over a funnel 44 disposed above the interface between print rolls 46, 48 in ink fountain 49. Introduction of wash medium to inlet 130 of self-washing filter 12, spray nozzles 34 and funnel 44 by solenoid valve 14 is explained in greater detail hereinafter.

The outlet of solenoid valve 16 is coupled by needle valve 50 and conduit 52 to a right angle inlet 132 of the self-washing filter 12. The outlet of solenoid valve 16 is also coupled by a conduit 54 to spray nozzles 56, 58 positioned above the print rolls 46, 48.

Another inlet 210 of self-washing filter 12 is coupled by a conduit 60 to an ink pump 62 positioned in compartment 70. As shown in FIG. 1, the self-washing filter 12 also includes an inlet 138 and an outlet 212. Inlet 138 is connected by conduit 64 to conduit 36, and outlet 212 is coupled to bypass valve 66 and a conduit 68. The outlet of conduit 68 is positioned in compartment 70. The outlet of a fountain drain 72 is coupled to a conduit 74 having an outlet which is also positioned in the compartment.

The self-washing filter 12 comprises an upper cylinder chamber 76 separated by a partition 78 from a lower cylinder chamber 80. A piston 82 connected to a piston rod 84 is reciprocable between upper and lower positions within upper cylinder chamber 76. The piston rod 84 reciprocates through an opening in partition 78. A spray nozzle 86 is connected to the end of piston rod 84 radially inward of a tubular filter screen 88 located in lower cylinder chamber 80.

During printing, the compartment 70 takes the form of an ink bucket or reservoir. Pump 62 pumps ink from the reservoir to lower cylinder chamber 80. Ink introduced into chamber 80 is filtered by screen 88 and pumped along conduits 64, 36 to funnel 44. The ink passes through the funnel onto the rolls 46 and 48. Excess ink is collected at the fountain drain 72 and returned through conduit 74 to the ink reservoir. Bypass valve 66 is adjusted to bleed off ink from chamber 80 back to the reservoir via conduit 68. That is, valve 66 is adjusted to regulate the flow of ink from chamber 80 through conduits 64, 36. Back flow of the ink to the outlet of solenoid valve 14 is blocked by check valve 40.

Prior to a wash operation, the ink reservoir is moved out of juxtaposition with pump 62 and is replaced by the wash compartment. Piston 82 is maintained in the initial, uppermost position by pre-loading the portion of chamber 76 below the piston with pressurized wash medium. In particular, the chamber is pre-loaded by operating solenoid valve 16 to admit pressurized wash medium through needle valve 50, conduit 52 and right angle passage 132 in partition 78. Thereafter, solenoid valve 16 is operated to block flow of wash medium to chamber 76, and solenoid valve 14 is operated to admit pressurized wash medium above piston 82 to initiate descent of the piston 82 against the fluid pressure of the wash medium below the piston.

In particular, pressurized wash medium is introduced to the portion of chamber 76 above piston 82 via conduits 24, 26, needle valve 28 and chamber inlet 130 located above the piston. The pressurized wash medium flows through the inlet and fills the portion of chamber 76 above the piston, forcing the piston to descend from its uppermost position. As the piston descends, spray nozzle 86 descends in chamber 80 along a path radially inward of filter screen 88. As the piston and spray nozzle descend, pressurized wash medium flows from the outlet of solenoid valve 14 through needle valve 38, check valve 40, conduit 42 and conduit 64 and passage 138 in partition 78 so as to wash chamber 80 and the spray nozzle and piston rod. Wash medium in compartment 80 is drained via bypass valve 66 and conduit 68.

During descent of piston 82, wash medium in chamber 76 below piston 82 is displaced, entering a plurality of orifices (designated collectively as 120 in FIG. 1) in the upper end of piston rod 84. The displaced wash medium travels through a passage in the piston rod and is ejected from spray nozzle 86 under relatively low pressure. The wash medium is collected at the outlet of lower cylinder chamber 80 and conducted via bypass valve 66 and conduit 68 to the wash compartment.

When operated, solenoid valve 14 also passes pressurized wash medium through needle valve 38, check valve 40, conduit 42 and conduit 36 to funnel 44. The wash medium passes through the funnel, washes the interface of rolls 46, 48, and is collected by drain 72 and conducted by conduit 74 to the wash compartment. Pressurized wash medium is also passed by solenoid valve 14 via conduits 24, 30 and needle valve 32 to spray nozzles 34. The spray nozzles spray the wash compartment and pump 62 with wash medium so as to clean the compartment and pump.

When piston 82 reaches its lowermost position in chamber 76, solenoid valve 16 is operated so as to admit pressurized wash medium to the portion of chamber 76 below the piston via needle valve 50, conduit 52 and right angle partition passage 132. Solenoid valve 14 may be operated so as to block flow of wash medium at this time. The pressurized wash medium entering passage 132 forces piston 82 to ascend against the fluid pressure exerted by the wash medium previously introduced in chamber 76 above the piston. Needle valves 28 and 50 are adjusted so that the differential in fluid pressure above and below piston 82 results in wash medium being injected in piston rod orifices 120 at relatively high pressure during ascent of the piston. The wash medium enters orifices 120 and travels through the piston rod and is ejected at relatively high pressure by spray nozzle 86. Preferably, nozzle 86 is adapted to eject the wash medium in a relatively flat disc-like pattern over 360° so as to thoroughly clean filter screen 88.

In addition, as the piston ascends, wash medium above the piston is driven out of chamber 76 via passage 130, needle valve 28, conduit 26, conduit 30 and needle valve 32 to spray nozzles 34 which spray compartment 70 and pump 62 with the wash medium.

When piston 82 reaches its uppermost position in chamber 76, solenoid valve 16 is operated so as to block further flow of wash medium to the chamber below the piston. Solenoid valve 14 may then be operated to re-admit pressurized wash medium to the portion of chamber 76 above the piston via conduits 24, 26 and needle valve 28, in the manner already described. Piston 82 therefore repeats its descent in chamber 76, and pressurized wash medium flowing through conduit 64 and partition passage 138 wash nozzle 86 and piston rod 84 as previously described.

Solenoid valves 14 and 16 are repeatedly operated as described to reciprocate the piston 82 within chamber 76. The solenoid valves may be operated automatically by a sequential control (not shown) or in response to manual push buttons. During reciprocation of the piston, the print rolls 46, 48, wash compartment, pump 62, filter screen 88, nozzle 86 and rod 84 are cleaned by the wash medium.

Figure 2:
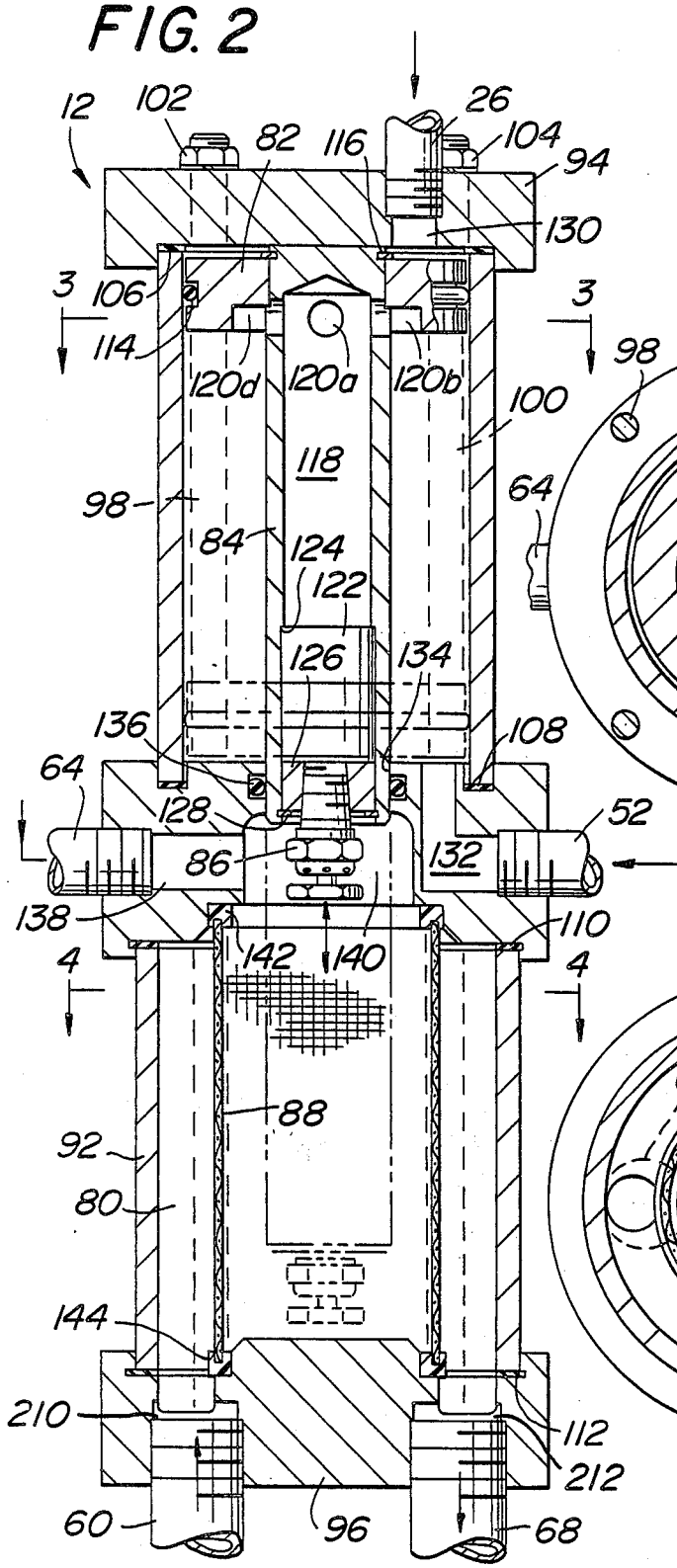
FIG. 2 is a section of the filter of the present invention.
Figure 3:
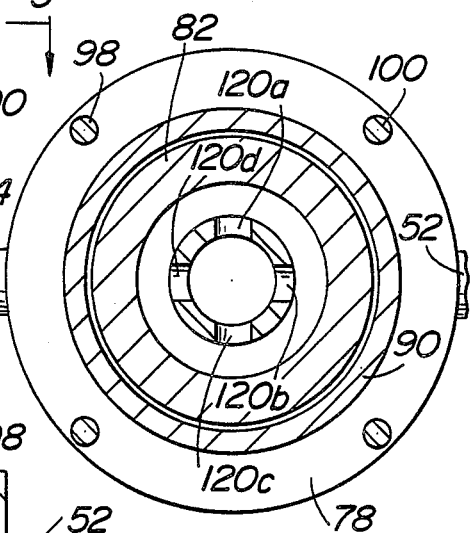
FIG. 3 is a section taken along 3—3 in FIG. 2.
Figure 4:
FIG. 4 is a section taken along 4—4 in FIG. 2.

Referring to FIGS. 2-4, there is shown a preferred embodiment of the self-washing filter 12 of the present invention. The filter includes cylinders 90, 92 which are sealed at their outer ends by caps 94, 96 respectively. Cylinders 90, 92 are seated at their inner ends on opposite faces of the partition 78. Four tie rods (two of which numbered 98, 100 are shown in phantom in FIG. 2) are positioned radially outwardly of cylinder 90. The tie rods are threaded in partition 78 and extend through clearance bores in cap 94. Hex nuts (two of which numbered 102, 104 are shown in FIG. 2) are threaded on the tie rods to secure cap 94 against the outer end of cylinder 90. Cap 94 is seated on a neoprene ring gasket 106, and cylinder 90 is seated on a neoprene ring gasket 108.

A pair of tie rods (not shown) are disposed radially outwardly of cylinder 92 and are threaded in cap 96. These tie rods extend through clearance bores in partition 78, and each rod is tapped at its upper end to threadedly receive a mating tie rod (not shown) which extends through a clearance bore in cap 94 and which is secured in position by a hand knob threaded on the rod. The partition 78 is seated on a neoprene ring gasket 110, and cylinder 92 is seated on a neoprene ring gasket 112.

The piston 82 is located in upper cylinder chamber 76 and is provided with an annular groove within which an O-ring 114 is seated. The piston is push fit on piston rod 84. Upward displacement of the piston 82 with respect to rod 84 is prevented by a snap ring 116. The piston rod is provided with a central passage 118 and four orifices 120a, 120b, 120c, 120d.

A cartridge type check valve 122 is inserted in the lower end of piston rod 84 abutting an annular shoulder 124 formed in the interior wall of the piston rod. Check valve 122 is captured by a ring-shaped plug 126 having a centrally located bore adapted to threadedly receive the stem of spray nozzle 86. Plug 126 is captured in the piston rod by a snap ring 128.

Cap 94 is provided with a passage 130 which serves as a fluid inlet for the portion of chamber 76 above piston 82. Partition 78 is provided with a right angle passage 132 which serves as a fluid inlet for the portion of chamber 76 below piston 82. The lower end of piston rod 84 extends through a centrally located opening 134 in partition 78 and wipes against an O-ring 136 seated in an annular groove in the partition. Partition 78 is also provided with a passage 138 which communicates with an inverted well-shaped cavity 140 formed in the partition 78. The filter screen 88 is secured at either end to ring-shaped support members 142, 144. Preferably, filter screen 88 comprises a pair of stainless steel wire screens having different meshes which are folded over and welded at their ends. The support members 142, 144 are molded over the ends of the welded screen to provide a unitary structure which is easily removable from the lower cylinder chamber.

Pressurized wash medium is introduced into the portion of chamber 76 below piston 82 via conduit 52 and passage 132 to pre-load the piston in the uppermost position (solid lines in FIG. 2). Pressurized wash medium introduced into the portion of chamber 76 above piston 82 via conduit 26 and passage 130 causes the piston to descend. As the piston decends, nozzle 86 descends in chamber 80 along a path coincident with the longitudinal axis of filter screen 88. Wash medium introduced into well-shaped cavity 140 via conduit 64 and passage 138 washes the nozzle 86 and piston rod 84 during the descent. Once piston 82 reaches its lowermost postion (broken lines in FIG. 2), pressurized wash medium is introduced into chamber 76 via conduit 52 and passage 132 against the fluid pressure exerted by the wash medium collected in the portion of chamber 76 above piston 82. The differential in pressure across the piston causes the piston to ascend. Pressurized wash medium continues to be introduced in the portion of chamber 76 below piston 82 such that the wash medium enters orifices 120a, 120b, 120c and 120d and flows through passage 118 and check valve 122 at relatively high pressure. The wash medium is ejected through the orifices of spray nozzle 86 as a relatively flat spray over 360° which thoroughly cleans filter screen 88. Once piston 82 returns to the uppermost position, pressurized wash medium is blocked from passage 132, and the piston may again be reciprocated between the uppermost and lowermost positions.

Preferably the solenoid valves 14, 16 are operated alternately, each over 15 second intervals, to introduce pressurized wash medium at passages 130, 132 and 138. Each valve is operated to pass pressurized wash medium over a 15 second interval while the other valve blocks the wash medium. A total wash cycle time may be 120 seconds. During 120 seconds, piston 82 descends four times and ascends four times in chamber 76. The type of wash medium may be varied during the wash cycle. For example, during the first 60 seconds of the wash cycle, the wash medium may comprise a mixture of heated water and detergent. During the next 60 seconds of the cycle, the wash medium may comprise water without detergent. A valve 200 may be employed to switch between the two mediums. The valve may be operated automatically or in response to manual pushbuttons.

The present invention may be embodied in other specific forms without departing from the spirit or essential attributes thereof and, accordingly, reference should be made to the appended claims, rather than to the foregoing specification, as indicating the scope of the invention.

I claim:

1. A self-washing filter for liquids comprising
   (a) a first cylindrical chamber
   (b) a second cylindrical chamber in axial alignment with said first chamber,
   (c) a partition between said first chamber and said second chamber,
   (d) a filter screen disposed within said second chamber,
   (e) a piston reciprocable between upper and lower positions in said first chamber, said piston defining an upper portion and a lower portion in said first chamber,
   (f) a rod connected to said piston, said rod being in axial alignment with said filter screen and extending at one end through an opening in said partition into said second chamber, said rod having a fluid passage therethrough and one or more orifices in communication with said fluid passage and said first chamber lower portion,
   (g) a nozzle for spraying fluid onto said screen, said nozzle being mounted on said rod end and being in communication with said rod fluid passage,
   (h) means for admitting pressurized wash liquid to opposite sides of said piston such that fluid pressure in the upper portion of said first chamber causes said piston to move thereby forcing wash liquid in the lower portion of said first chamber through said rod orifices and said rod fluid passage to said nozzle, whereby said nozzle moves along a linear path in axial alignment with said filter screen while spraying said filter screen.

2. A self-washing filter in accordance with claim 1 including a check valve in said rod for blocking liquid flow from said second chamber to said first chamber.

3. A self-washing filter in accordance with claim 1 wherein said means for admitting wash liquid to opposite sides of said piston includes first and second passages connected to a source of pressurized wash liquid and valve means for directing the wash liquid alternately to said first and second passages.

4. A self-washing filter in accordance with claim 1 wherein said filter screen is a cylinder in axial alignment with said second chamber, said filter screen being open at one end adjacent said partition so as to admit said nozzle and said filter screen being closed by said second chamber at the other end.

5. A self-washing filter in accordance with claim 1 wherein said second cylindrical chamber includes a first passage for admitting liquid to be filtered and said partition includes a passage open to the interior of said filter screen for passage of filtered liquid.

6. A self-washing filter in accordance with claim 5 wherein said second cylindrical chamber includes a second passage for exhausting wash liquid.

* * * * *